(12) United States Patent
Xu et al.

(10) Patent No.: US 7,808,526 B2
(45) Date of Patent: Oct. 5, 2010

(54) METHODS AND SYSTEMS FOR EXAMPLE-BASED TV COLOR CALIBRATION

(75) Inventors: Ning Xu, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1218 days.

(21) Appl. No.: 11/398,150

(22) Filed: Apr. 4, 2006

(65) Prior Publication Data

US 2007/0229667 A1    Oct. 4, 2007

(51) Int. Cl.
*H04N 17/02* (2006.01)
(52) U.S. Cl. ........................ 348/189; 348/180
(58) Field of Classification Search ......... 348/177–179, 348/180, 184, 189–191; 345/600, 594, 589; 702/85, 108, 127; *H04N 17/00, 17/02*
See application file for complete search history.

(56) References Cited

U.S. PATENT DOCUMENTS

| 5,369,432 A | * | 11/1994 | Kennedy | 348/189 |
| 5,483,259 A | * | 1/1996 | Sachs | 345/600 |
| 6,525,772 B2 | * | 2/2003 | Johnson et al. | 348/189 |
| 6,850,245 B1 | * | 2/2005 | Murashita et al. | 345/589 |

OTHER PUBLICATIONS

U.S. Appl. No. 11/128,761, filed May 12, 2005, N. Xu et al.
U.S. Appl. No. 11/378,870, filed Mar. 16, 2006, N. Xu et al.

* cited by examiner

*Primary Examiner*—Sherrie Hsia
(74) *Attorney, Agent, or Firm*—Kenneth L. Sherman, Esq.; Michael Zarrabian, Esq.; Myers Andras Sherman LLP

(57) ABSTRACT

An example-based method and system for electronic display color calibration is provided. By comparing the colors of commonly available objects with a color database under a controlled lighting condition, the user adjusts the gain and offset parameters of the Red, Green and Blue color components of the display. Two different methods are provided, wherein one method involves manipulating the comparison colors in the RGB color space, and the other method involves manipulating the comparison colors in the CIE x-y plane. Two different systems that incorporate the example-based color calibration methods are also provided, wherein one system directly implements the calibration method in the television system, while the other system implements the calibration method as a separate tool for viewers to calibrate the color of their displays.

20 Claims, 10 Drawing Sheets

800

METHODS AND SYSTEMS FOR EXAMPLE-BASED TV COLOR CALIBRATION

FIELD OF THE INVENTION

The present invention relates generally to display calibration, and more particularly, to color accuracy of the display calibration process.

BACKGROUND OF THE INVENTION

Accurately reproducing color on a television display has been a very important problem for television (TV) manufactures. The objective for accurate color reproduction is to reproduce exactly the same colors on the TV display as those colors are perceived by humans in the real world. However, reproducing accurate color is extremely difficult since most input and output devices currently use device dependent color spaces (e.g., RGB and YUV) to represent colors.

In attempt to accurately reproduce color, the television industry has defined color standards so that if both the input device and output device comply with the same standard, accurate color could be reproduced. The color standards make the color reproduction easier, but still, it is difficult and expensive to completely comply with the color standard.

The traditional CRT television which uses phosphors is more conducive to compliance with the color standard, while newer display (e.g., LCD, DLP, PDP) are less so. Usually, for a high end TV display, a professional color calibration is needed to achieve better color reproduction.

After a television is manufactured, the three primary colors are fixed. However, some other parameters can be adjusted for color correction, for example, the black level (offset) and the white level (gain) of each primary color can be adjusted.

Typically, the calibration professionals use so called gray scale tracking to adjust such parameters with the help of expensive instruments that can measure light chromaticity and correlated color temperature. Customers who buy a high-end display need to expend additional funds to have the display calibrated for best possible video quality from the display.

BRIEF SUMMARY OF THE INVENTION

An object of the present invention is to provide methods and systems for television color calibration which addresses the above shortcomings. According to the present invention, the customers can calibrate the color accuracy of their television displays without using the expensive professional instruments.

Instead, using an example-based method according to an embodiment of the present invention, by comparing the commonly available daily objects (e.g., envelopes, cans, bottles, etc.) with their colors shown on the display, the customer can himself/herself calibrate the color accuracy and intuitively. Customer can perform a side-by-side comparison of an object's actual colors as they appear to user, with the colors of an image of the object on the display. Based on the comparison, customers can calibrate the color of their displays. With this method, the customer does not have to use the expensive calorimeters or spectroradiometers.

Example-based methods for television display color calibration, and systems that implement that method allowing a user (customer) to calibrate their color displays, are provided.

A first embodiment incorporates a calibration method in the television and its remote control functionality. The user can use the remote control to access an object database directly and intuitively adjust the color parameters. A second embodiment includes a DVD disk that contains an object database and a corresponding color patch database, wherein the customer can use a DVD player to show the color patches of their selected object and use the remote control to adjust the color parameters.

These and other features, aspects and advantages of the present invention will become understood with reference to the following description, appended claims and accompanying figures.

DETAILED DESCRIPTION OF THE INVENTION

A television set usually provides adjustable parameters for color calibration. Conventionally, a professional calibrator adjusts the offset and gain of each color component to achieve the standard SMPTE-C color, which is the current standard for broadcasting in America.

According to an embodiment of the present invention, these TV color parameters are adjusted using a calibration procedure which does not require the use of calorimeters but only the use of example objects. Using an example-based method according to an embodiment of the present invention, by comparing the commonly available daily objects (e.g., envelopes, cans, bottles, etc.) with their colors shown on the TV display, the customer can himself/herself calibrate the color accuracy and intuitively. Customer can perform a side-by-side comparison of an object's actual colors as they appear to the user, with the colors of an image of the object on the display. Based on the comparison, customers can calibrate the color of their displays. With this method, the customer does not have to use the expensive calorimeters or spectroradiometers.

Further, example-based methods for television display color calibration, and systems that implement that method allowing a user (customer) to calibrate their color displays, are provided. A first embodiment incorporates a calibration method in the television and its remote control functionality. The user can use the remote control to access an object database directly and intuitively adjust the color parameters. A second embodiment includes a DVD disk that contains an object database and a corresponding color patch database, wherein the customer can use a DVD player to show the color patches of their selected object and use the remote control to adjust the color parameters.

Figure 1A:
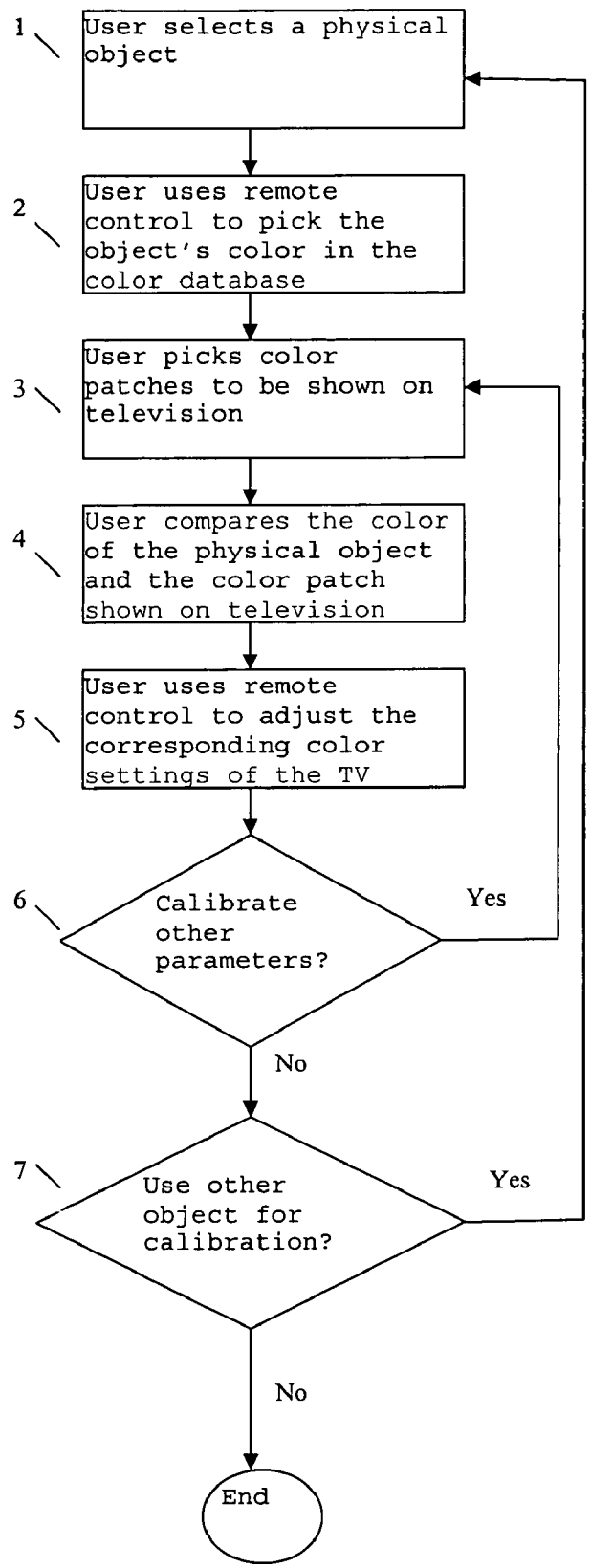
FIG. 1A shows a flowchart of steps of an embodiment of example-based TV color calibration, according to an embodiment of the present invention.

FIG. 1A shows a flowchart of steps of an embodiment of example-based TV color calibration, according to an embodiment of the present invention, including the following steps:

1. User selects a physical object having colors;
2. User uses remote control to pick the object's color from a color database displayed on the TV;
3. User picks color patches to be shown on the TV;
4. User compares the color of the physical object and the color patches shown on television;
5. User uses remote control to adjust the corresponding color settings of the TV;
6. Go to step 3 above to calibrate other color parameters;
7. Go to step 1 above to calibrate or use other object for calibration, or go to step 8 below to end the calibration process;
8. End.

In the following, we first describe the categories of common objects, and then present how to prepare a color database for those objects. After that, we present the calibration method with the help of example objects and their measured colors, and finally present two different example systems that incorporate the example-based color calibration methods.

Categories of Common Objects

A set of user selected commonly accessible objects with fixed colors are used for color calibration according to one embodiment of the present invention. Many of such objects are readily available in daily life, e.g., some brand name commercial products. Typically the colors printed on such commercial products follow very strict color codes which are not changed because the color presentations are part of their valued brand name. The colors from such commercial products, or other standard sources, can be used to calibrate the color reproduction of the television display according to the present invention. Depending on the geographic location where a television is sold, different example objects may be selected since some are more popular in one location and others are more popular in other locations.

Depending on the color printed on a selected object, the example objects are divided into different categories. Because the television systems usually contain three primary colors (i.e., Red, Green and Blue), in one example according to the present invention, we roughly pick three major categories of objects: red objects, green objects, and blue objects. The object within the red category will have a dominant and constant red color, which contains high value in red component and low values in green and blue components. Using this example object in red category will enable the adjustment of the gain parameter of TV display's Red color and the offset parameters of Green and Blue colors. Similarly, the object within the green category helps adjustment of TV display's Green gain parameter and offset parameters of Red and Blue, and the object within the blue category helps the adjustment of TV display's Blue gain parameter and offset parameters of Red and Green.

In another example according to the present invention, in addition of the three primary color categories, more color categories can be used, such as yellow, cyan and magenta categories. The object within the yellow category can help in adjusting the gain parameters of TV display's Red and Green color and the offset parameter of Blue color. Similarly, the objects in cyan and magenta categories will in adjusting the gain parameters of TV display's corresponding parameters.

In addition, two other color categories can be added, one is the bright gray color category and the other is the dark gray color category. The object within the bright gray color category can help in adjusting the gain parameters of all three color components of the TV display, while the object within the dark gray category can help in adjusting the offset parameters of all three color components the TV display.

As there are only six parameters of the TV display color to adjust, two objects in the opponent color categories are sufficient for the TV display color calibration. Alternatively, users have the option to pick any objects for color calibration, for example, one object from each primary color category. A user can also pick only an object with the color they care about most for calibration.

According to an embodiment of the present invention, the television manufacturer provides a color database that contains a large number of colors from example objects. The more possible objects in each category, the better, as that makes it easier for the user to find a set of objects appropriate for the color calibration procedure. An example of such a object database (e.g., 908 FIG. 9A, 920 FIG. 9B) can include categories: 1. Red, 2. Green, 3. Blue, 4. Yellow, 5. Cyan, 6. Magenta, 7. Bright gray, 8. Dark gray, etc.

Preparation of Color Databases

For accurate color calibration based on example objects, the colors of the example objects should be measured very carefully for each object in the object database. For a given object, the color perceived mainly depends on the color of the light source, its direction and the viewing direction. These need to be controlled carefully in both the color measuring steps and the color calibration steps.

The process of preparing a color data base (e.g., 908 FIG. 9A, 920 FIG. 9B), includes the steps of: 1. Measuring color in XYZ color space; 2. Converting color to RGB color space; and 3. Storing the color in the database. The steps are described in greater detail below. In one example according to the present invention, two common light sources are considered. One is using the daylight, and the other is using the television itself as a light source. When using the daylight as the light source, we are assuming that the average of all the surfaces within the room have a neutral gray color so that the lighting condition is not changing and the perceived object color is same. When using the television display itself as a light source, the lights in the room should be turned off so that the light emitted from the television becomes the only major light source in the room.

Figure 1B:
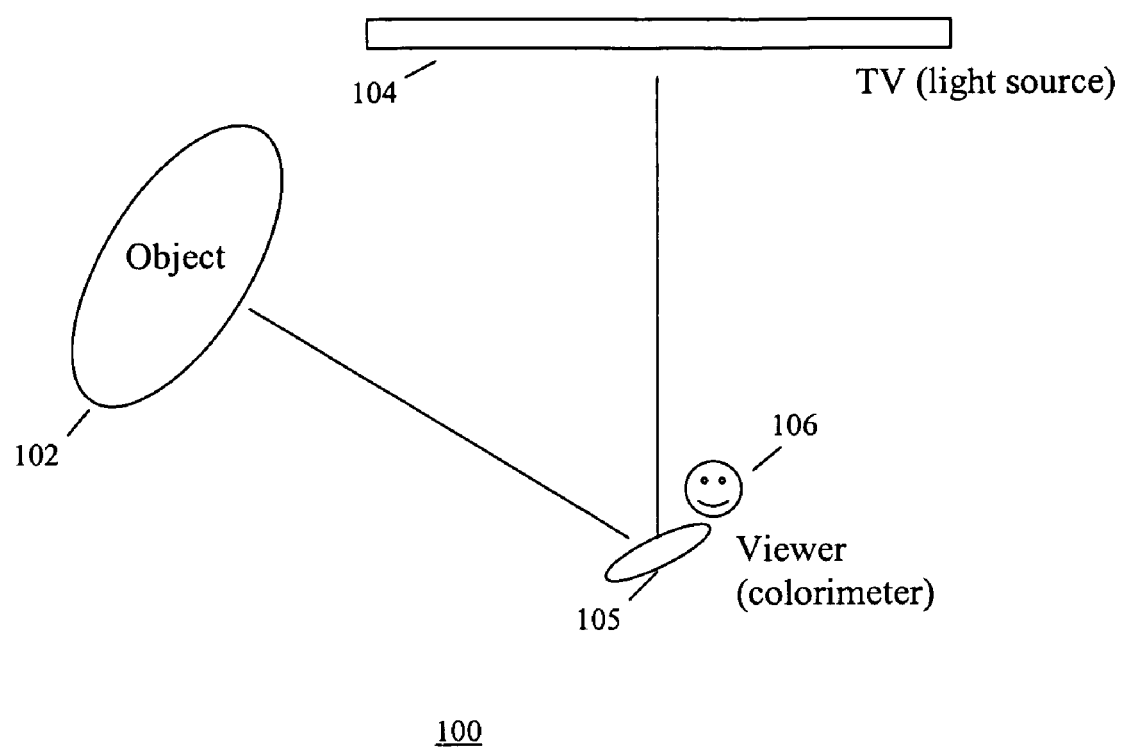
FIG. 1B shows an example geometry relationship of an object, television and viewer position when performing an example-based color calibration, according to an embodiment of the present invention.

FIG. 1B shows an example geometry relationship 100 of positions of an object 102, a light source 104 and a calorimeter (user) 105 when performing the example based color calibration. In FIG. 1B, the object 102 is placed on the front and left (or right) side of the television 104 so that the calorimeter 105 are at the same distance from both the object 102 and the television 104. At the same time, the light emitted from the television 104 can reach a surface of the object 102 and make it visible.

The object color is measured by the colorimeter 105 at the same viewing position as the viewer 106 when the viewer is performing the color calibration. CIE XYZ color space is used when measuring the object color. The relationship between RGB values and the CIE XYZ values is according to example relation (1) below:

$$\begin{pmatrix} X \\ Y \\ Z \end{pmatrix} = M_0 \begin{pmatrix} R \\ G \\ B \end{pmatrix} \quad (1)$$

$$= \begin{pmatrix} 0.3935 & 0.3653 & 0.1916 \\ 0.2124 & 0.7011 & 0.0866 \\ 0.0187 & 0.1119 & 0.9582 \end{pmatrix} \cdot \begin{pmatrix} R \\ G \\ B \end{pmatrix}.$$

From the measured CIE XYZ values, the RGB values can be calculated according to example relation (2) below:

$$\begin{pmatrix} R \\ G \\ B \end{pmatrix} = M_0^{-1} \begin{pmatrix} X \\ Y \\ Z \end{pmatrix}. \quad (2)$$

For comparison, a small patch of the example color on the object will be shown on the television display 104, together with other color patches with slightly different colors. When we are using the television 104 as light sources, we will show a bright white color as the background so that the luminance is high. However, when, as described further below, we are showing the comparison color patches on the television 104, the light source itself is changed. Therefore, we need to measure the object color when the television is showing the comparison color patches.

Thus, according to the examples herein, we measure colors for each object with two different light sources: daylight and television light showing white background and the color patches. Then we convert the measured color from XYZ color space to RGB color space and store the results in a database (e.g., table) for the color calibration.

Calibration Methods

Two different example-based color calibration methods according to the present invention are now described. According to the first calibration method, we manipulate the colors to be shown on the television for comparison (comparison colors) in the RGB color space, while in the second method, we manipulate the comparison colors on the CIE x-y plane.

First Color Calibration Method

In the first color calibration method, for a user selected example object whose color is measured and converted to RGB color space as (R, G, B), we first find out which category it belongs to. Three cases can be distinguished. In the first case, the color belongs to Red, Green, or Blue category, which means one of the primary color components is dominating and the other two components are weak. In the second case, two of the primary color components are dominating and the third component is weak and the color belongs to Yellow, Cyan or Magenta category. In the third case, either three of the primary color components are dominating, or the three color components are all weak.

Figure 2:
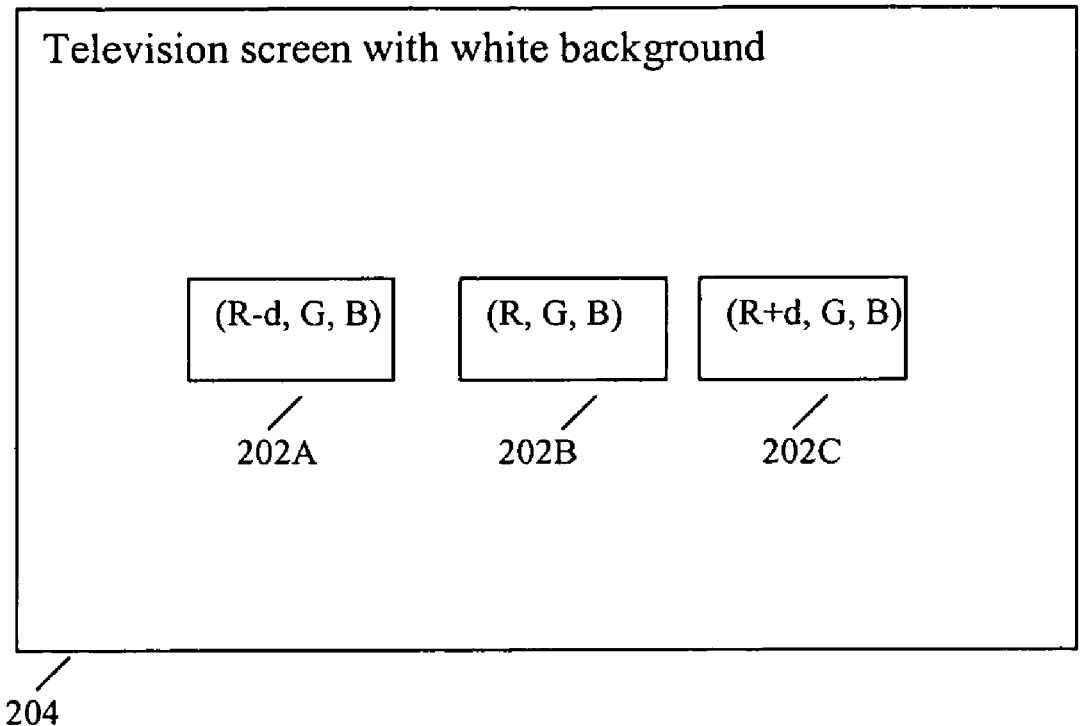
FIG. 2 shows an example color pattern shown on a television display for example-based color calibration, according to an embodiment of the present invention.

For the first case, assuming the object color is in Red category, as shown by example 200 in FIG. 2 three color patches 202A-C are then be shown on the television screen 204. The television screen 204 shows a white background and the three color patches 202A-C show three different colors, where Green and Blue components are same and have small differences in the Red components. The center color patch 202B has color (R, G, B), the left color patch 202A has color (R−d, G, B), and the right color patch 202C has color (R+d, G, B), where d indicates a delta value in the Red component.

The user then compares the eye-perceived object color with the three colors shown on the TV display 204. If the left side color patch 2020A is more similar to the perceived object color than the other two patches, the viewer can use the remote control to reduce the gain of the Red color of the TV display 204 until the center patch 202B is the most similar color among the three color patches. On the contrary, if the right side color patch 202C is more similar, the viewer can use the remote to increase the gain of Red color of the TV display 204.

After the gain parameter of Red color of the TV display is adjusted, the user can adjust the offset parameters of Green and Blue color of the TV display. The user can adjust the offset parameters of Green color of the TV display as shown by example 300 in FIG. 3 while the color patches 302A-C are shown on the displays 304. The television screen 304 is showing a white background and the three color patches 302A-C show three different colors, where Red and Blue components are the same and have small differences in the Green components.

Figure 4:
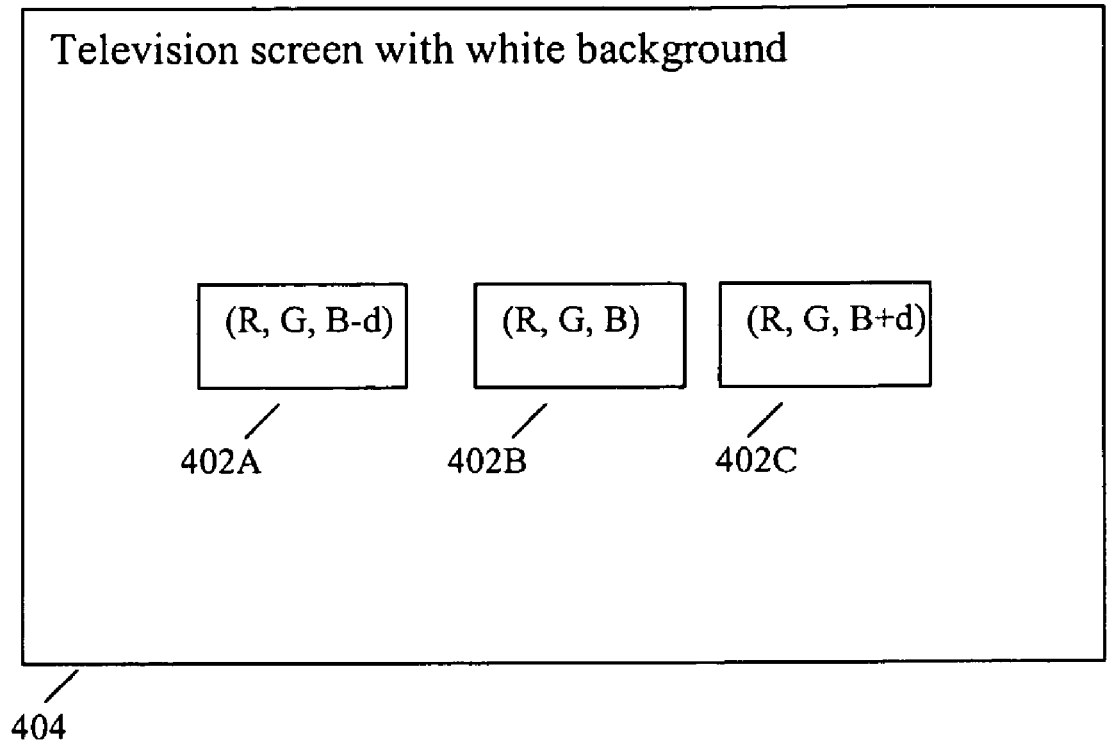
FIG. 4 shows another example color pattern shown on a television display for example-based color calibration, according to an embodiment of the present invention.

The user can also adjust the offset parameters of Blue color of the TV display as shown by example 400 in FIG. 4 while the color patches 402A-C are shown on the displays 404. The television screen 404 is showing a white background and the three color patches 402A-C show three different colors, where Green and Red components are the same and have small differences in the Blue components.

Figure 5:
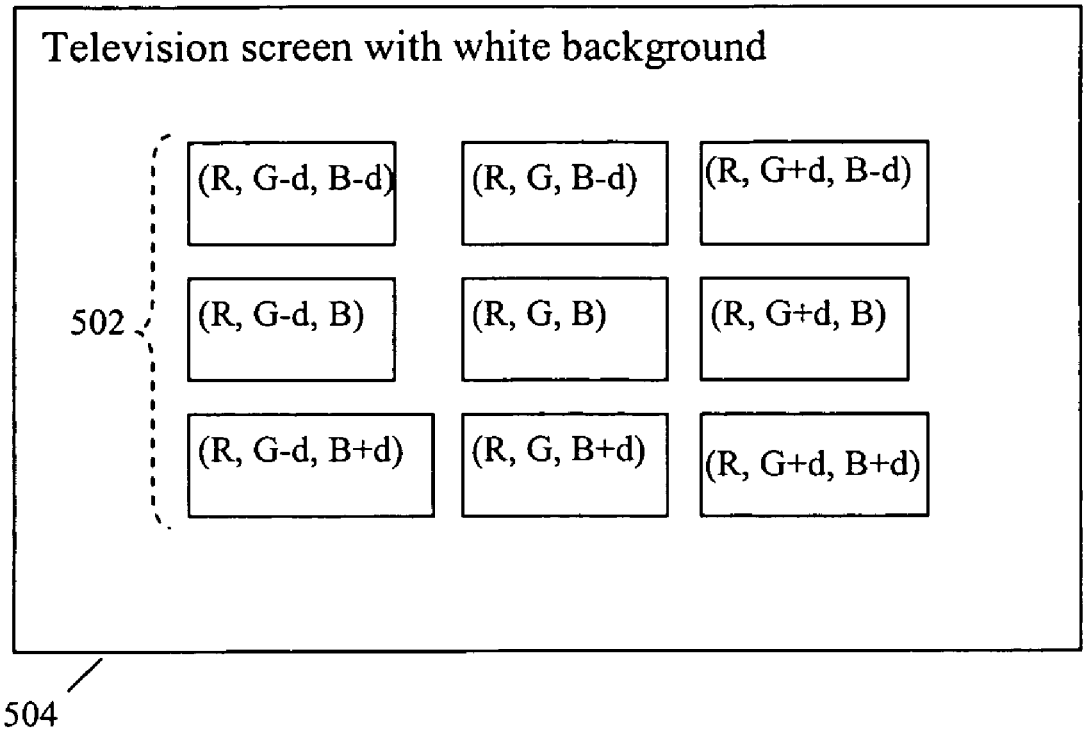
FIG. 5 shows another example color pattern shown on a television display for example-based color calibration, according to an embodiment of the present invention.

Further, the user can adjust the two offsets Green and Blue color together as shown by example 500 in FIG. 5 while the example nine color patches 502 in FIG. 5 are shown on the television display 504. The television screen 504 is showing a white background and the nine color patches 502 show nine different colors, where the Red component is same but the Green and Blue components have small differences.

Figure 3:
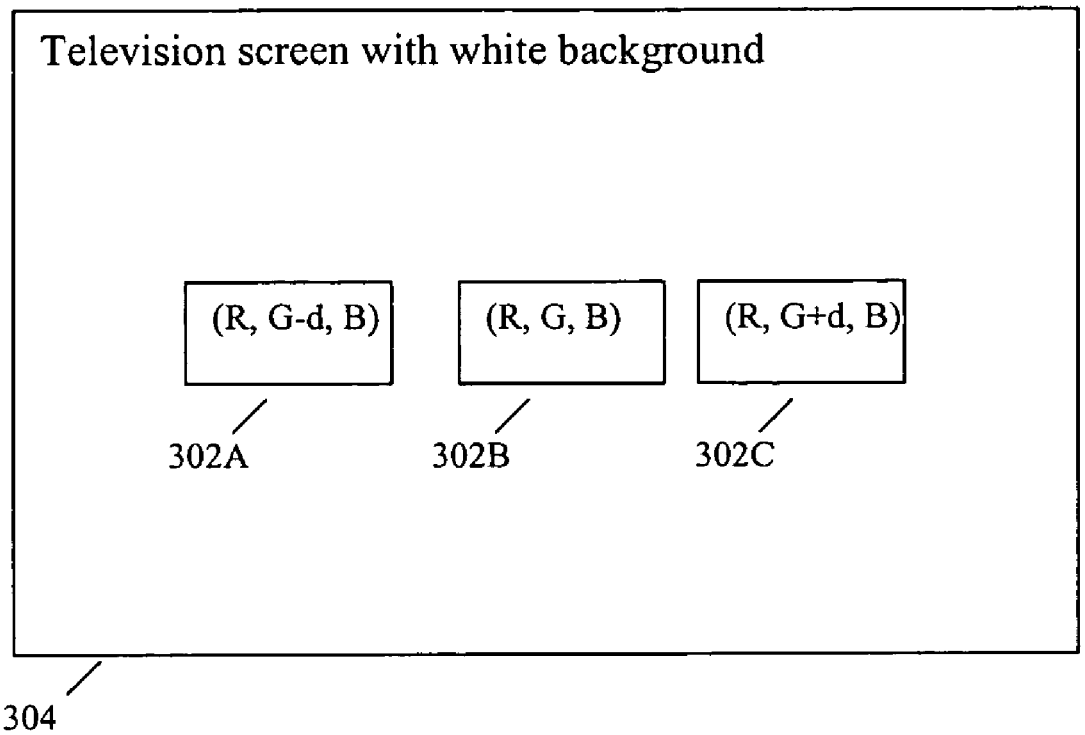
FIG. 3 shows another example color pattern shown on a television display for example-based color calibration, according to an embodiment of the present invention.

While using the example color patches 302A-C in FIG. 3 or color patches 402A-C in FIG. 4, in each example the user can use a TV remote control to adjust the Green offset or Blue offset until the center color patch (302B or 402B) becomes the most similar color among the three color patches in each of FIGS. 3-4.

While using color patches 502 as shown in FIG. 5, the user can adjust the offsets of Green color and Blue color together until the center color patch is the most similar color among the nine color patches.

For using objects in other categories (green and blue categories) of the first case, a similar method as described above for objects in red category can be applied to calibrate the gain parameters of Green color and Blue color, and also the offset parameters of the Red color, of the TV display. Redundant adjustments of these parameters can be carried out to reach a parameter setting that converges.

For the second case further above, wherein two of the primary color components are dominating and the third component is weak and the color belongs to Yellow, Cyan or Magenta category, similar approaches can be used to calibrate the gain and offset parameters of the three color components.

For the third case further above, wherein either three of the primary color components are dominating, or the three color components are all weak, similar approaches can be used to calibrate the gain and offset parameters of the three color components.

Second Color Calibration Method

In the second example-based color calibration method according to the present invention, we manipulate the colors in CIE x-y plane instead of the RGB color space. As shown by example 600 in FIG. 6, the three SMPTE-C standard primary colors are shown in the x-y plane as the three vertices 602A-C of the triangle 604 with sides 606A-C. The measured object color C (608) is also shown on the CIE x-y plane. Six new colors are selected on the lines 610A-C connecting the measured color C and the vertices 602A-C of the triangle 604.

Figure 6:
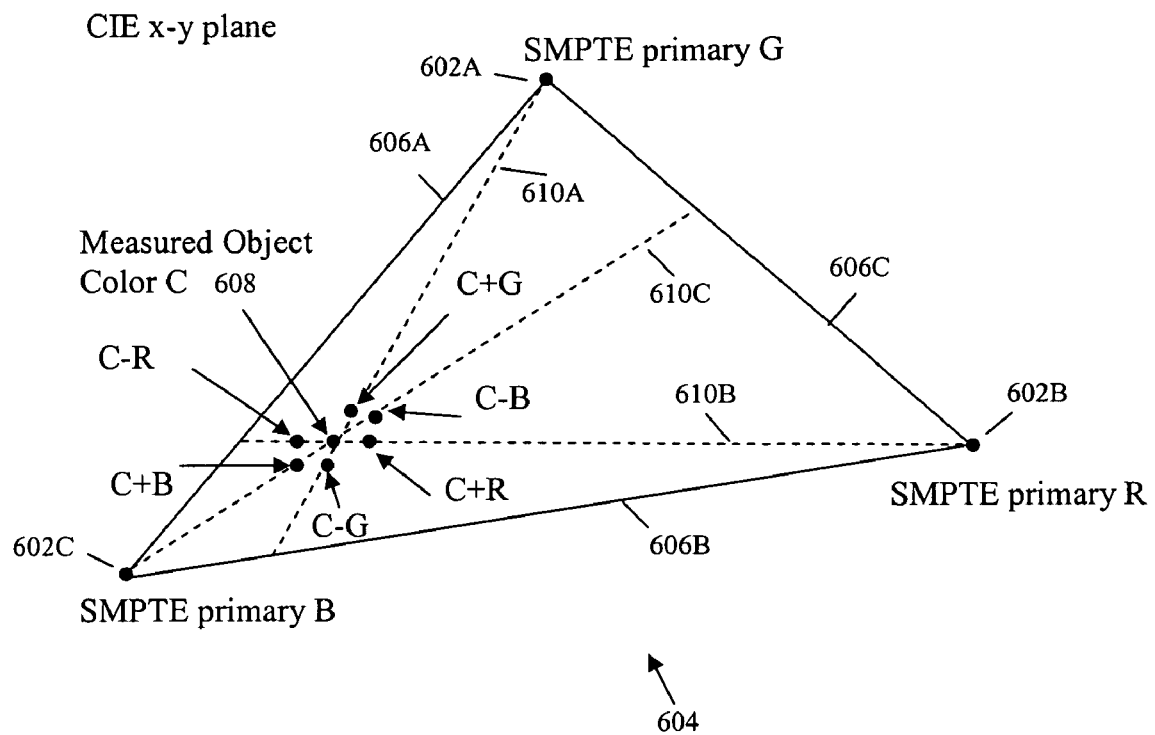
FIG. 6 shows an example SMPTE primary triangle and the measured object color C on the CIE x-y plane, according to an embodiment of the present invention.

The measured color C is located within the triangle 604. For the six new colors we calculate six new x-y values on the lines 610A-C connecting the measured color 608 to the three vertices 602A-C, with the same distance between the new colors and the measured color C. The x-y values for the six new colors are C−R, C+B, C−G, C+R, C−B and C+G, and the x-y locations of the six new colors are shown in FIG. 6.

Figure 7:
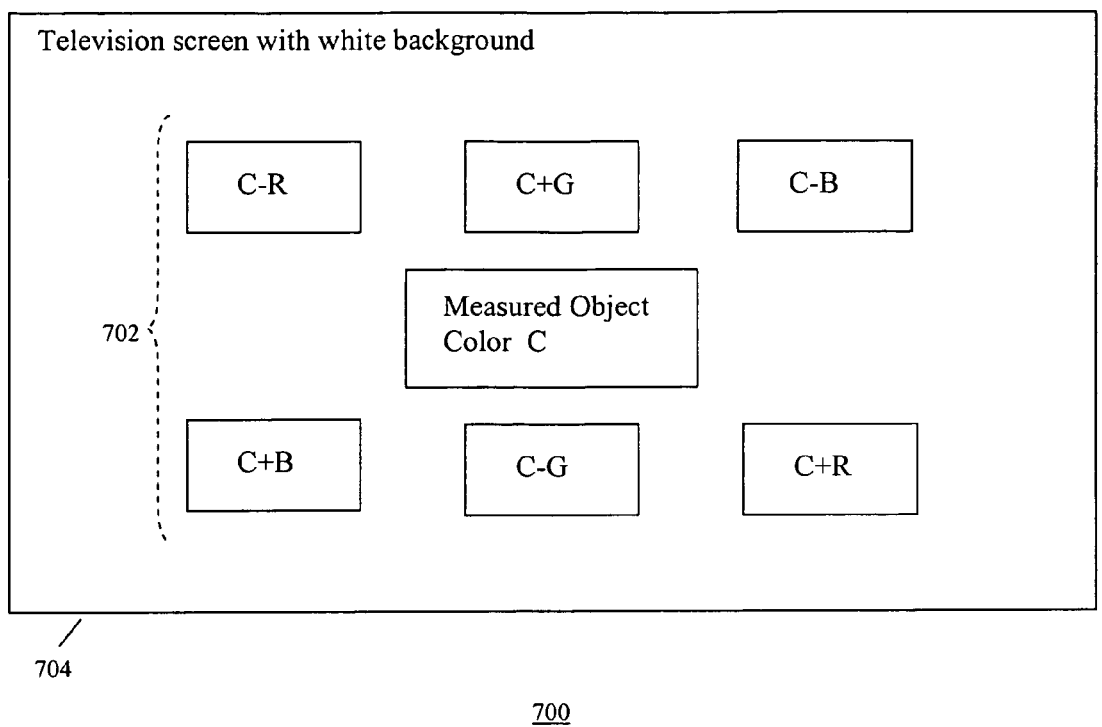
FIG. 7 shows another example color pattern shown on a television display for example-based color calibration, according to an embodiment of the present invention.

As shown by example 700 in FIG. 7, these six new colors (i.e., C−R, C+B, C−G, C+R, C−B and C+G), with the same Y value, are converted to RGB color spaces and shown together with the measured object C color as seven color patches 702 on a display 704. The center color is the measured object color and the surrounding six colors showing the six new colors according to FIG. 6. The television display 704 is showing a white background and the seven color patches (i.e., C, C−R, C+B, C−G, C+R, C−B and C+G) show seven different colors, wherein the center color is the measured object color C and the surrounding six colors showing the new colors selected according to the example 600 in FIG. 6 above.

Similar to the first color calibration method above, if the object color belongs to the Red category, in the example 700 of FIG. 7, we adjust the gain parameter for Red color and offset parameters for Green and Blue colors. Depending on the most similar color patch on the display 704, we can adjust the above mentioned three parameters (i.e., the gain parameter for Red color and offset parameters for Green and Blue colors) until the center color patch C becomes the most similar color to the actual object color. To adjust, if the color patch labeled C+R is the most similar color, the user can increase the gain parameter of the Red color. Similarly, the user can decrease the gain parameter of the Red color if the color patch labeled C−R is the most similar color. In the same way, the user can increase or decrease the offset parameters of the Green or Blue color until the color on the center patch C becomes the most similar to the object color among all the colors shown on the display 704. Further, similar to using the first color calibration method, the same color calibration procedure can be carried on for other example objects the user chooses.

Systems Implementing the Example-Based Color Calibrations

Figure 9A:
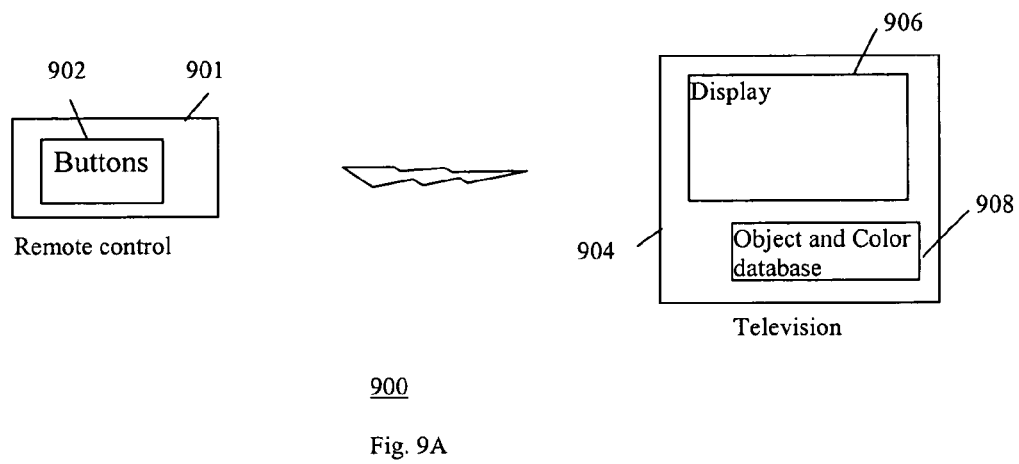
FIG. 9A shows an embodiment of an example-based color calibration system which incorporates example-based color calibration method directly into the television system, according to an embodiment of the present invention.

According to an aspect of the present invention, the example-based color calibration methods described above are incorporated directly in the television system, as shown by example system 900 in FIG. 9A. In the system 900, a remote control 901 including buttons 902 communicates with a TV 904 which includes a display 906 and object and color database 908 incorporating said color calibration methods.

In the example of FIG. 9A for television systems that incorporate the example-based color calibration method, the object database and the corresponding color database are stored in database 908 in the television 904. At the same time, some new remote control functions may need to be added. In one of the embodiment of the present invention, one button or a combination of buttons on the remote control is defined for customer color calibration function. Once the customer starts the color calibration, the available example objects will be shown on the television screen and the user can browse through these possible example objects and select the object to be used. The user further chooses the lighting condition, either the common daylight, or using the television itself as the only light source (described above). After the corresponding light condition is set and the object is placed besides the television, the user (viewer) can use the remote control to increase or decrease the selected display color parameters until the center color patch of the calibration patches displayed becomes the best match of the object color (e.g., as described above in relation to FIGS. 2-5 and 7).

Figure 8:
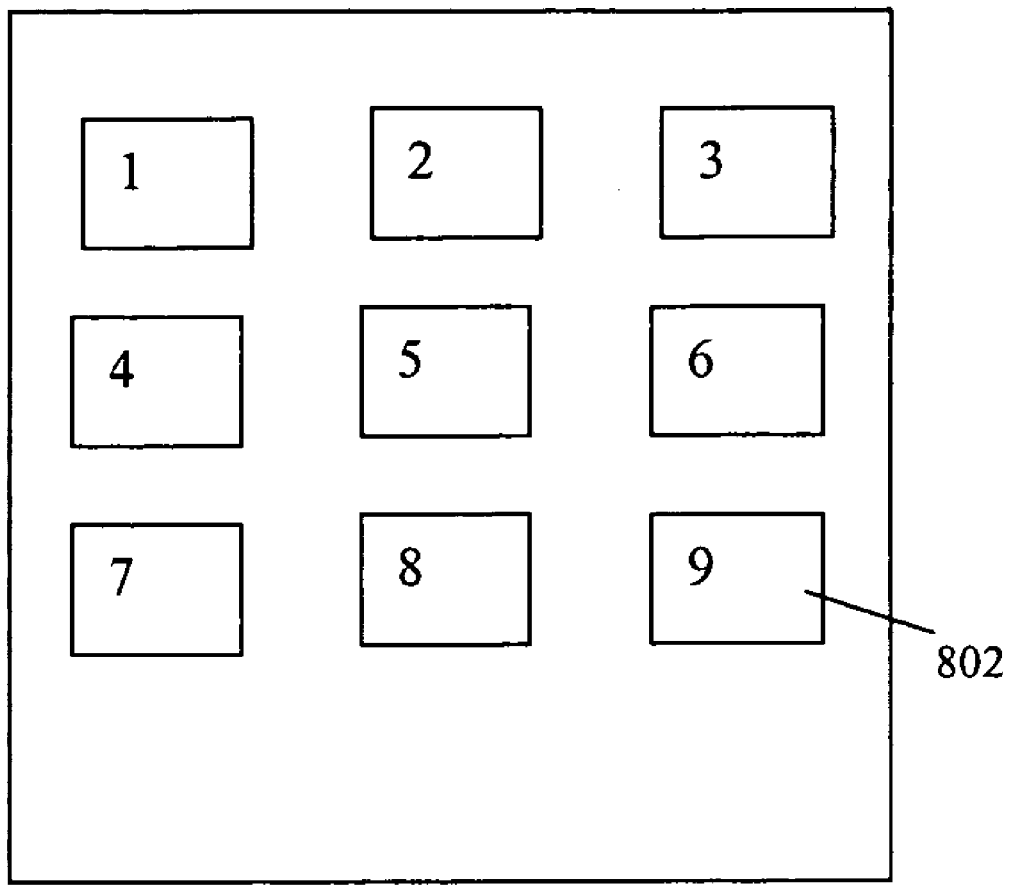
FIG. 8 shows an example layout of the digit buttons on a television remote control, according to an embodiment of the present invention.

In one of the example embodiments of the present invention, the digit buttons of the remote control are used for the user to pick up the best match calibration color patch on the screen. FIG. 8 shows an example television remote control 800 and layout of such digit buttons 802 on the remote control 800. For example, in the case where the TV display screen is showing the calibration color patches 702 as in FIG. 7, and the digit buttons 802 on the remote control 800 are arranged as in FIG. 8, each button function can defined as follows:

Button 1: the color C−R is the best match;
Button 2: the color C+G is the best match;
Button 3: the color C−B is the best match;
Button 7: the color C+B is the best match;
Button 8: the color C−G is the best match;
Button 9: the color C+R is the best match;
Button 5: the color C is the best match, and the current settings are stored.

Similar button function assignment can be defined for the color patches shown in FIG. 2, FIG. 3, FIG. 4 and FIG. 5. After each button is pressed, the corresponding color parameter (gain or offset) of the television display is adjusted accordingly via corresponding signals from the remote controller to a color settings control unit in the television display.

For the first color calibration method described above, the user can first be adjusting the TV display gain (offset) parameters of one color component and then adjusting the offset parameters of the other color components, together, or one by one. Once the color parameter adjustment is finished for one example object, the user can use the remote control 800 to pick another available example object and start calibration again, until the user is satisfied with the TV display color settings.

For the second color calibration method described above, the user can adjust the gain or offset parameters of all color three components together. Once the adjustment is done, the user can use the remote control 800 to pick another available example object and start calibration again, until the user is satisfied with the TV display color settings.

Figure 9B:
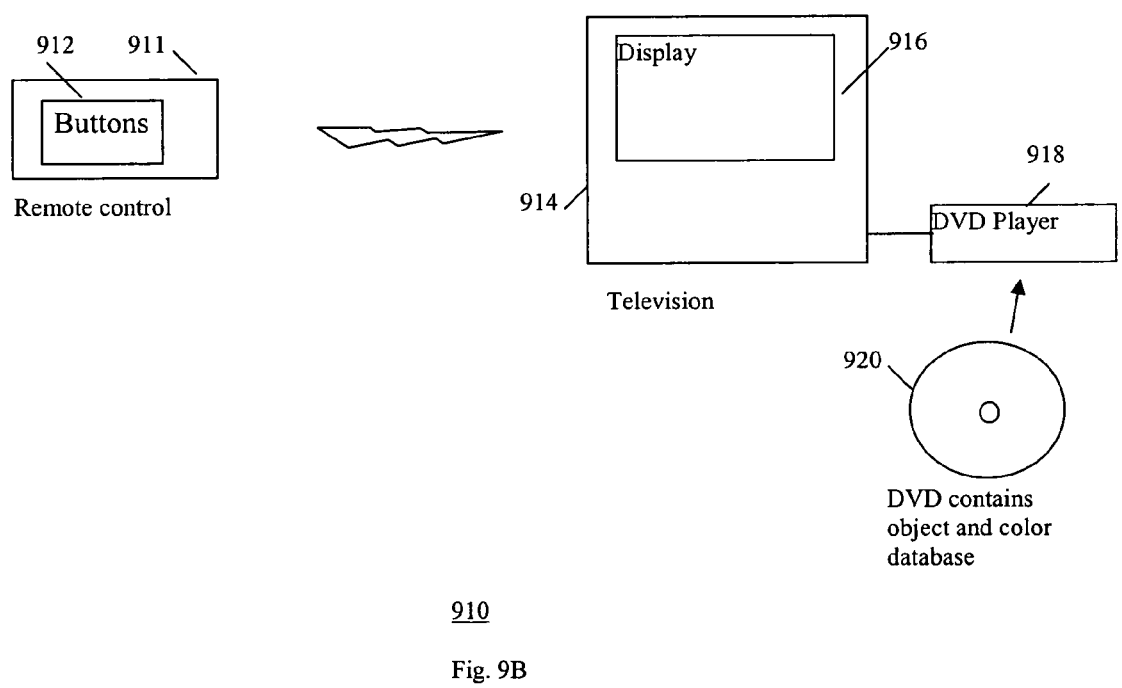
FIG. 9B shows an embodiment of an example-based color calibration system which incorporates example-based color calibration method in a calibration tool separate from the television system, according to an embodiment of the present invention.

Such calibration methods can also be implemented as a separate tool for customers to calibrate the color of their televisions as shown by example system 910 in FIG. 9B. In the system 910, a remote control 911 including buttons 912 communicates with a TV 914 which includes a display 916. A separate tool comprising a DVD player 918 accepts a DVD 920 which stores object and color database incorporating said color calibration methods. Implementation as a separate tool enables the calibration of both the existing televisions and the televisions to be produced.

The example FIG. 9B is for systems implementing the example-based color calibration method as an independent tool for the customer. In one example, the object database and the corresponding color database are stored on media such as a DVD disk, and played through a DVD player. The objects and color patterns can be shown on the television display through a menu navigation system of the DVD player. For adjusting the gain and offset parameters of a color component, the user uses the television's remote control to access the individual settings and adjust it accordingly.

In both of the above example calibration systems (e.g., FIGS. 9A-B), the manufacturer of the television or the DVD distributors can provide the buyers some pre-printed color paper to replace the common accessible object so that the user need not worry about acquiring example objects. Using the preprinted color paper as example, the same calibration methods and systems as described above will work as well.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of calibrating an electronic display, comprising:
   providing an object database including object identifications and corresponding color definitions associated with the identified objects;
   selecting an object and associated colors from the object data base;
   showing a calibration pattern on the display based on said object colors from the database;
   obtaining a physical version of the object's colors;
   comparing the displayed calibration pattern with the physical version of the object's colors; and
   calibrating the display colors based on the comparing of the displayed calibration pattern with the physical version of the object's colors.

2. The method of claim 1 wherein providing the object database further comprises:
   measuring colors of selected objects; and
   constructing the object database which includes identifications of the selected objects and corresponding definitions for the measured colors associated with the identified objects.

3. The method of claim 2 wherein measuring colors of selected objects further includes providing different lighting conditions to illuminate the selected objects for color measurements.

4. The method of claim 3 wherein providing different lighting conditions further includes:
   providing daylight as light source for the lighting conditions, and
   providing light from the display monitor itself as the only light source for the lighting conditions.

5. The method of claim 3 wherein measuring the colors further includes:
   spatially positioning the selected object, the display and a colorimeter according to a pre-defined geometry relationship, wherein the colorimeter is proximate to a viewer facing the display and the selected object is positioned to be visible to the viewer for color.

6. The method of claim 1 wherein calibrating further includes:
   selecting a lighting condition; and
   using a controller to adjust the calibration pattern color gain and offset parameters on the display based on the comparison, to essentially match the physical object's colors on the display.

7. The method of claim 6 wherein the controller comprises a remote control device to control the display color gain and offset parameters.

8. The method of claim 6 wherein obtaining a physical version of the object's colors further includes obtaining a set of prints of object color's for comparison with the calibration pattern color on the display.

9. The method of claim 1 wherein the display shows colors that are manipulated in the RGB color space.

10. The method of claim 1 wherein the display shows colors that are manipulated on the CIE x-y plane.

11. A calibration system for calibrating an electronic display, comprising:
    a storage device that stores an object database including object identifications and corresponding color definitions associated with the identified objects; and
    a controller for calibrating the display colors by comparison with one or more color definitions in the object database,
    wherein a displayed calibration pattern is compared with a physical version of an object's colors and the controller adjusts the calibration pattern color gain and offset parameters on the display based on the comparison, to essentially match the physical object's colors on the display.

12. The calibration system of claim 11 wherein the display shows the calibration pattern on the display based on said object colors from the database in the storage device.

13. The calibration system of claim 12 wherein a viewer selects an object and associated colors from the object data base, and the display shows the calibration pattern on the display based on said object colors from the database, wherein the viewer compares the displayed calibration pattern with the physical version of the object's colors such that based on user commands the controller adjusts the calibration pattern color gain and offset parameters on the display based on the comparison.

14. The system of claim 13, wherein the controller comprises a remote control device to control the display color gain and offset parameters.

15. The system of claim 13 wherein the physical version of the object's colors comprises a set of prints of object color's for comparison with the calibration pattern color on the display.

16. The system of claim 13 wherein the controller comprises a remote control device to control the display color gain and offset parameters.

17. The system of claim 11 wherein the storage device comprises recordable media on which the object database is stored.

18. The system of claim 11 wherein the storage device comprises recordable media on which the object database, and a corresponding color database, are stored.

19. A television system comprising:
    an electronic display;
    a calibration system for calibrating the display colors, the calibration system comprising:
      a storage device that stores an object database including object identifications and corresponding color definitions associated with the identified objects, and
      a controller for calibrating the display colors by adjusting the display color parameters based on a comparison of a physical version of an object's color with corresponding color patches from the object database shown on the display, wherein the color patches are associated with one or more color definitions in the object database.

20. The television system of claim 19 wherein the controller comprises a remote control device to control the display color gain and offset parameters, whereby a viewer adjusts the display color parameters while comparing the color of the object with the corresponding color patches from the object database shown on the display.

* * * * *